Sept. 30, 1952     A. R. LINTERN     2,612,349
RADIATOR TYPE HEAT EXCHANGER
Filed April 10, 1950
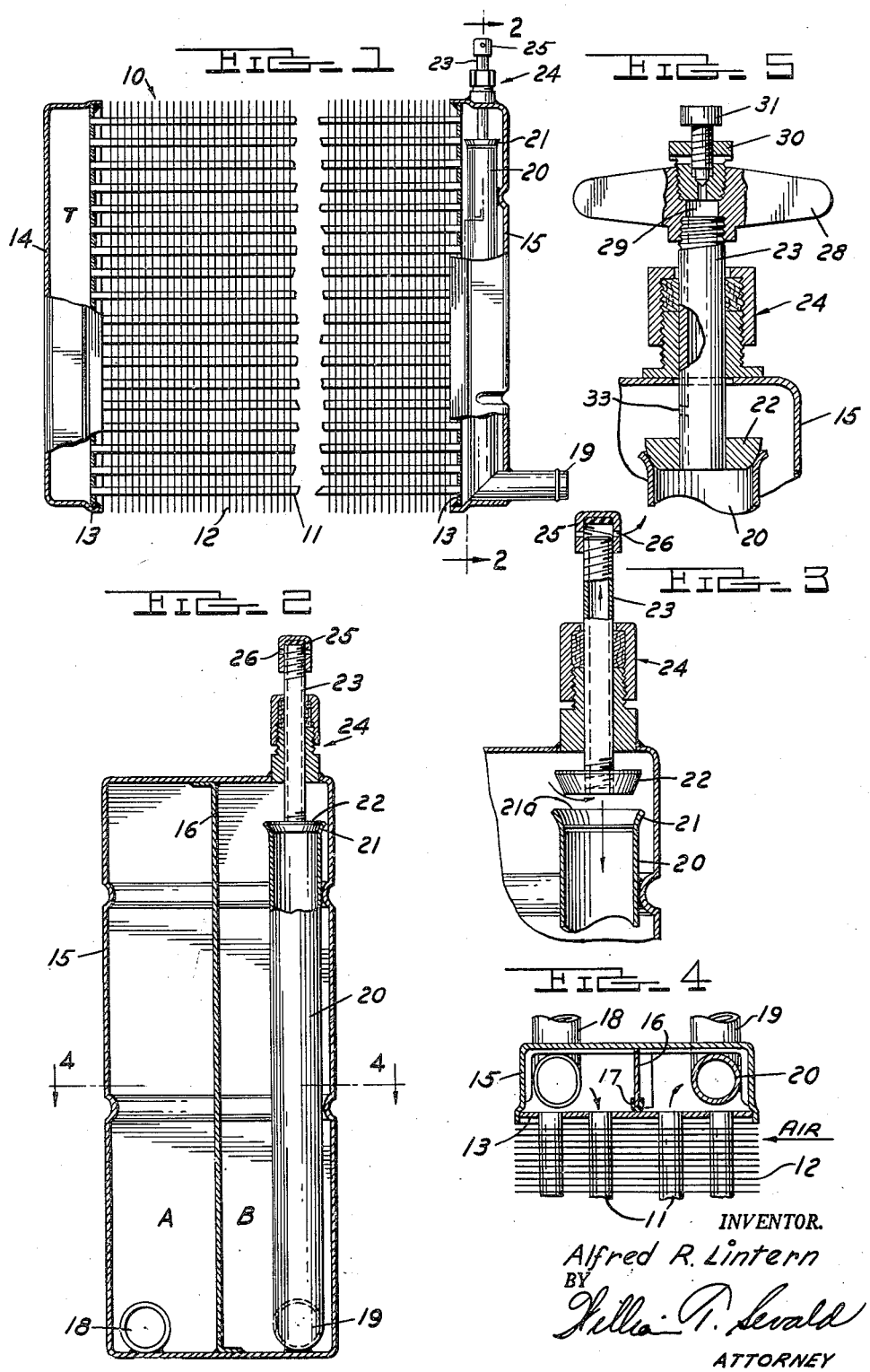

Patented Sept. 30, 1952

2,612,349

UNITED STATES PATENT OFFICE 2,612,349

RADIATOR TYPE HEAT EXCHANGER

Alfred R. Lintern, Grosse Pointe Farms, Mich., assignor to A. R. Lintern Inc., Detroit, Mich., a corporation of Michigan Application April 10, 1950, Serial No. 155,097

7 Claims. (Cl. 257—144)

This invention generally relates to vehicular circulating core hot water space heaters and particularly pertains to a new, novel and inventive water-level tube, air bleeder valve, and water control valve therefor.

A vehicular hot water space heater gives best results when the core is maintained full of heating liquid with all air evacuated and when the flow of liquid in the core is regulatable to facilitate controlling heat production.

It is, therefore, the primary object of the invention to provide means for positively insuring the proper level of heating liquid in the heater core, evacuating air from the heater core, and controlling the flow of heating liquid in the core.

An object of the invention is to provide a combined air-bleeder valve, water-control valve, and liquid level tube, for a vehicular hot water space heater.

An object of the invention is to provide an air-bleeder valve, a water-control valve and a liquid level tube for a vehicular hot water space heater which will insure the core being filled with water regardless of a low water level in the vehicle cooling system.

An object of the invention is to provide an inexpensive combined water-control valve, air-bleeder valve, and liquid level tube.

An object of the invention is to provide a simple, easily manipulated combined water-control valve and air-bleeder valve.

An object of the invention is to provide a water level tube equipped with an enlarged flared end to receive water in a cascading turbulent state in sufficient volume to equal the capacity of the body of the tube.

An object of the invention is to utilize the enlarged flared end of the water level tube as a valve seat.

An object of the invention is to provide a (stopper type) valve seatable in the valve seat formed by the flared end of the water level tube to throttle, stop, or permit unrestricted circulation.

An object of the invention is to provide automatic liquid level means in the heater.

An object of the invention is to provide a heater with the inlet and outlet pipes on the same level on the same end of the heater.

These and other objects of the invention will become apparent by reference to the following description of a combined air-bleeder valve, water-control valve, and core water-level tube for a vehicular hot water space heater taken in connection with the accompanying drawing, in which:

Fig. 1 is a side elevational view of the invention with parts broken away to better illustrate the internal construction therof.

Fig. 2 is a cross-sectional view of Fig. 1 taken on the line 2—2 thereof.

Fig. 3 is a partial view similar to Fig. 2 showing the bleeder valve and water-control valve in the open position.

Fig. 4 is a cross-sectional view of Fig. 2 taken on the line 4—4 thereof, and

Fig. 5 is an elevational view of an optional form of air-bleeder valve.

Referring now to the drawings wherein like numerals refer to like and corresponding parts throughout the several views, the air-bleeder valve, liquid-control valve, and core liquid-level tube disclosed therein to illustrate the invention comprises a core 10, ducts 11 in the core 10, heat radiating fins 12 on the ducts 11, perforate plates 13 sealably receiving the ends of the ducts 11 in the perforations thereof, a can 14 soldered to one plate 13 closing one end of the core 10 providing a liquid circulation chamber T at one end of the core 10, a can 15 soldered to the other plate 13 at the other end of the core 10 providing a liquid chamber at the other end of the core 10, a separator 16 soldered to the can 15 dividing its chamber into a liquid intake chamber A and a liquid outlet chamber B, a sealing strip 17 sealing the separator 16 relative to the adjacent plate 13, a liquid inlet pipe 18 soldered to the can 15 leading to the intake chamber A thereof, a liquid outlet pipe 19 soldered to the can 15 leading from the outlet chamber B thereof, a tube 20 disposed in the outlet chamber B soldered to the outlet pipe 19 projecting upwardly to a point approximately at the top of the core 10, a flared end 21 on the tube 20 providing a valve seat 21-A, a valve stopper 22 having an aperture therethrough seatably seatable on the valve seat 21, a valve operating and air evacuating tube 23 leading into the can 15 connected to the valve 22 communicating with the chamber B via the aperture in the valve 22, a gland 24 sealably and movably supporting the operating and air evacuating tube 23 relative to the can 15, an air valve cap 25 threaded on the exterior end of the tube 23 having air vent 26 therein. An optional type of air-bleeder valve comprises a valve actuating handle 28 on the valve tube 23 having an axial orifice 29 communicating with the tube 23, a valve seat socket 30 threaded in the handle 28, a valve 31 threaded in the socket 30 adapted to vent or seal the atmosphere end of the tube 23 and a vent 33 in the tube 23.

The liquid enters the heater at the intake pipe 18, flows through the inlet chamber A, enters the ducts 11 leading from the chamber A and flows into the transfer chamber T, enters the ducts leading to the outlet chamber B, enters the tube 20 in the inlet chamber B, and enters the outlet pipe 19. It can be seen that the liquid flows in one direction from the can 15 to the can 14 and in a reverse direction from the can 14 back to the can 15 preventing short circuiting of the flow of the heating liquid and facilitating a double pass of heating liquid through the core 10. It can also be seen that no liquid can leave the heater via the outlet pipe 19 unless and until the liquid in the heater is above the top end of the liquid level tube 20. The heater is easily filled to this level by gravity or by the engine water pump when the valve stopper 22 is off the seat 21-A with the air valve 25 open allowing escape of the air head in the core 10 and cans 14 and 15.

When the valves 25 and 22 are open allowing air to bleed from the heater, the heating liquid enters the heater at the intake pipe 18 and rises in the intake chamber A of the can 15, travels through the ducts 11 leading from the chamber A to the chamber T of the can 14, travels through the ducts 11 leading from the chamber T of the can 14 to the outlet chamber B of the can 15 and the liquid continues to rise in the chambers A, T and B until the liquid achieves a level in the heater above the upper end of the liquid level tube 20, at which point the liquid is free to spill into the tube 20 and enter the outlet pipe 19 from which the liquid is conducted to the cooling system of the engine by suitable ducts. When all the air is evacuated from the heater, the air valve 25 is manually closed; when less heat than the maximum is required the valve 22 can be manually positioned adjacent the valve seat 21 constricting the flow of liquid in the core to the desired rate; and when no heat is required, the valve stopper 22 is manually seatable on the seat 21 entirely preventing flow of liquid in heater. When the valve 22 is off the seat 21-A, air can be bled from the heater via the orifice in the valve 22, the tube 23, and the valve cap 25 or via the optional valve 31.

The heater can be installed above the liquid level of the engine as the water pump on the engine can fill the heater to its proper level regardless of the liquid level of the cooling system of the engine. This is facilitated by the fact that the liquid level tube 20 of the heater prevents the liquid in the heater running out of the outlet pipe 19 and the water pump on the engine prevents the liquid in the heater from running out the inlet pipe 18. Thus the heater remains full of liquid above the liquid level of the engine whether the engine is running or not and due to the fact that the head of liquid in the heater is on the pump, no liquid head is operative on the air vented portion of the engine cooling system so that none of the liquid in the heater will run out the overflow pipe of the vehicle radiator. Installation of the heater is facilitated by the fact that the inlet pipe 18 and the outlet pipe 19 are positioned on the same end of the heater and at the same level.

In operation the operator can regulate the flow of liquid through the heater by adjusting the valve stopper 22 relative to the valve seat 21 and in this way he controls the amount of heated liquid delivered to the heater which ultimately controls the amount of heat radiated by the heater as the heater is entirely dependent for heat supply on the amount of heated liquid received.

The operator can also easily keep the heater full of liquid by bleeding the trapped air therefrom by unscrewing the cap 25 on the air vent tube 23 or by unscrewing the optional valve 31.

In that the air bleeder valve is disposed on the liquid control valve operating stem 23, the operator is constantly reminded to bleed the air from the heater when he operates the liquid control valve stopper 22.

The flared end 21 on the liquid level outlet tube 20 is very important in that it not only provides a valve seat 21-A but also provides an enlarged receiving end for the tube 20 which is capable of permitting a quantity of liquid into the tube 20 commensurate with the transmission capacity of the tube 20; the flared end 21 provides an enlarged spillway shaped to conform to the annular cascade of liquid spilling into the tube 20 thereby eliminating air pockets and turbulence at the lip and eliminating intersecting angular convergence of the annular spill of the liquid. Rather the flared end 21 insures a substantially parallel convergence of the annular spill into the tube 20 without turbulence and air pockets. In other words, the flared end 21 on the tube 20 smoothly leads annular spill of water into the tube 20 without turbulence or pockets in ample quantity to completely utilize the transmission capacity of the tube 20.

The direction of air circulation through the core 10 is preferably in the direction indicated by the arrow in Fig. 4 with the air first circulating through the cooler half of the core and then passing through the hotter half of the core and in this manner the heat of the core is more efficiently transferred to the air and the air emerges at a higher temperature than otherwise.

The hollow water-valve operating tube 23 air vent 33 vents the trapped air in core 10 in the event the valve 22 is seated on the valve seat 21A while the tube 23 and apertured valve 22 vents the trapped air in the event the vent 33 is in the area of the gland 24.

Although but a single embodiment of the invention has been shown and described in detail, it is obvious that many changes may be made in the size, shape, detail and arrangements of the elements of the invention within the scope of the appended claims.

I claim:

1. A vehicular hot water space heater comprising a horizontal core, a can on one end of said core housing a transfer chamber communicating with the entire area of said core, a can on the other end of said core housing an intake chamber communicating with half the area of said core and an outlet chamber communicating with the other half of the area of said core, an inlet pipe communicating with said inlet chamber, an outlet pipe communicating with said outlet chamber, a liquid level tube disposed in said outlet chamber connected to said outlet pipe extending upwardly from said outlet pipe to a point adjacent the top of said outlet chamber whereby liquid in the heater circulates from said inlet pipe to said outlet pipe by traveling via said inlet chamber, half said core to said transfer chamber, half said core to said outlet chamber, and said liquid level tube to said outlet pipe, a valve seat on the upper end of said liquid level tube, and a valve seatable on said valve seat operable to permit unrestricted flow of liquid into said liquid level tube, regulate flow of liquid into said liquid level tube, or entirely prohibit flow of liquid into said liquid level tube.

2. A vehicular hot water space heater comprising a horizontal core, a can on one end of said core housing a transfer chamber communicating with the entire area of said core, a can on the other end of said core housing an intake chamber communicating with half the area of said core and an outlet chamber communicating with the other half of the area of said core, an inlet pipe communicating with said inlet chamber, an outlet pipe communicating with said outlet chamber, a liquid level tube disposed in said outlet chamber connected to said outlet pipe extending upwardly from said outlet pipe to a point adjacent the top of said outlet chamber whereby liquid in the heater circulates from said inlet pipe to said outlet pipe by traveling via said inlet chamber, half said core to said transfer chamber, half said core to said outlet chamber, and said liquid level tube to said outlet pipe, a valve seat on the upper end of said liquid level tube, a valve seatable on said valve seat operable to permit unrestricted flow of liquid into said liquid level tube, regulate flow of liquid into said liquid level tube, or entirely prohibit the flow of liquid into said liquid level tube; said valve having an aperture constituting an air vent, a hollow valve actuating tube communicating with said vent leading to atmosphere, and an air release valve normally closing said valve actuating tube.

3. A vehicular hot water space heater comprising a horizontal core, a can on one end of said core housing a transfer chamber communicating with the entire area of said core, a can on the other end of said core housing an intake chamber communicating with half the area of said core and an outlet chamber communicating with the other half of the area of said core, an inlet pipe communicating with said inlet chamber, an outlet pipe communicating with said outlet chamber, a liquid level tube disposed in said outlet chamber connected to said outlet pipe extending upwardly from said outlet pipe to a point adjacent the top of said outlet chamber whereby liquid in the heater circulates from said inlet pipe to said outlet pipe by traveling via said inlet chamber, half said core to said transfer chamber, half said core to said outlet chamber, and said liquid level tube to said outlet pipe, a valve seat on the upper end of said liquid level tube, a valve seatable on said valve seat operable to permit unrestricted flow of liquid into said liquid level tube, regulate flow of liquid into said liquid level tube, or entirely prohibit the flow of liquid into said liquid level tube; said valve having an aperture constituting an air vent, a hollow valve actuating tube communicating with said vent leading to atmosphere, and an air release valve normally closing said valve actuating tube; said inlet pipe and said outlet pipe being on the same end of said core and at the same level.

4. A vehicular hot water space heater comprising horizontal heat liberating ducts, vertical heat radiating fins on said ducts, perforate face plates soldered to said ducts with the ducts disposed in the perforations of said plates at either end thereof, an imperforate first can soldered to one said face plate housing a transfer chamber communicating with all said ducts at one end of said ducts, a second can soldered to the other said plate housing a chamber communicating with all said ducts at the other end of said ducts, said second can having two apertures in its side wall at the same level, a separator disposed in said second can soldered thereto dividing the chamber into an intake chamber communicating with half said ducts and one of the apertures and an outlet chamber communicating with the other half of said ducts and the other aperture, an intake pipe disposed in the aperture of said intake chamber for supplying hot water to said intake chamber from the vehicle cooling system, whereby water supplied enters said intake chamber, travels through said ducts communicating therewith to said transfer chamber, through said transfer chamber to said ducts communicating with said outlet chamber, and through said ducts to said outlet chamber; an outlet pipe disposed in the aperture of said outlet chamber for transmitting water back to the vehicle engine cooling system, a water level tube connected to said outlet pipe leading upwardly from said outlet pipe to a point adjacent the top of said outlet chamber whereby the water level in said cans and ducts must be above the end of said tube before water can be transmitted to said outlet pipe, a valve seat on said water level tube and a valve stopper seatable on said seat adapted to allow unrestricted water circulation in said cans and ducts, to completely restrict water circulation in said cans and ducts, and to throttle water circulation in said can and ducts.

5. A vehicular hot water space heater comprising horizontal heat liberating ducts, vertical heat radiating fins on said ducts, perforate face plates soldered to said ducts with the ducts disposed in the perforations of said plates at either end thereof, an imperforate first can soldered to one said face plate housing a transfer chamber communicating with all said ducts at one end of said ducts, a second can soldered to the other said plate housing a chamber communicating with all said ducts at the other end of said ducts, said second can having two apertures in its side wall at the same level, a separator disposed in said second can soldered thereto dividing the chamber into an intake chamber communicating with half said ducts and one of the apertures and an outlet chamber communicating with the other half of said ducts and the other aperture, an intake pipe disposed in the aperture of said intake chamber for supplying hot water to said intake chamber from the vehicle cooling system, whereby water supplied enters said intake chamber, travels through said ducts communicating therewith to said transfer chamber, through said transfer chamber to said ducts communicating with said outlet chamber, and through said ducts to said outlet chamber; an outlet pipe disposed in the aperture of said outlet chamber for transmitting water back to the vehicle engine cooling system, a water level tube connected to said outlet pipe leading upwardly from said outlet pipe to a point adjacent the top of said outlet chamber whereby the water level in said cans and ducts must be above the end of said tube before water can be transmitted to said outlet pipe, a valve seat on said water level tube, a valve stopper seatable on said seat adapted to allow unrestricted water circulation in said cans and ducts, to completely restrict water circulation in said cans and ducts, and to throttle water circulation in said cans and ducts; said valve stopper having an aperture therein constituting an air vent, a hollow valve operating rod connected to said valve communicating with said aperture and communicating with atmosphere, and an air valve cap normally closing said hollow rod at atmosphere adapted for operation to release trapped air in said cans and ducts.

6. A hot water space heater for a vehicle comprising a core, a can on one end of said core communicating with the entire core end, a divided can on the other end of said core having a first and second chamber each communicating with half of said core, a hot water intake pipe on the first chamber of said divided can, a hot water outlet pipe on the second chamber of said divided can, a water level tube in the second chamber connected to said outlet pipe with its open end positioned approximately at the top of said core whereby said core is substantially full of water when said water level tube transmits water to said outlet pipe, a valve seat on said water level tube, and a water valve seatable on said seat adapted to throttle water flow, permit unrestricted water flow, or to entirely prevent water flow into said outlet pipe via said water level tube.

7. A hot water space heater for a vehicle comprising a core, a can on one end of said core communicating with the entire core end, a divided can on the other end of said core having a first chamber and a second chamber each communicating with substantially half said core, a hot water intake pipe connected into the first chamber of said divided can, a hot water outlet pipe connected to the second chamber of said divided can, a water level tube in the second chamber connected to said outlet pipe with its open end positioned approximately at the top of said core whereby said core is substantially full of water when said water level tube transmits water to said outlet pipe, a valve seat on said water level tube, a water valve stopper seatable on said seat adapted to throttle water flow, permit unrestricted water flow, or to entirely prevent water flow into said outlet pipe via said water level tube, a hollow water valve stopper operating rod operably connected to said water valve stopper having an aperture communicating with the interior of the heater and disposed with its exterior end communicating with atomsphere providing an air vent for the interior of the heater for bleeding trapped air in the heater, and an openable, normally closed, air valve sealing the exterior end of said hollow water valve operating rod.

ALFRED R. LINTERN.

REFERENCES CITED

The following references are of record in the file of this patent:

UNITED STATES PATENTS

| Number | Name | Date |
|---|---|---|
| 487,901 | Blackmore | Dec. 13, 1892 |
| 828,961 | Diehl | Dec. 18, 1906 |
| 1,547,861 | Davis | July 28, 1925 |
| 1,668,491 | Caesar | May 1, 1928 |
| 1,717,770 | Grace | June 18, 1929 |
| 1,843,295 | Nichols | Feb. 2, 1932 |
| 2,032,660 | Kagi | Mar. 3, 1936 |
| 2,118,263 | Myerhoefer | May 24, 1938 |
| 2,164,628 | Sibley | July 4, 1939 |
| 2,444,958 | Smith | July 13, 1948 |

FOREIGN PATENTS

| Number | Country | Date |
|---|---|---|
| 506,012 | Great Britain | May 22, 1939 |
| 343,713 | France | Aug. 13, 1904 |